Figure 11:
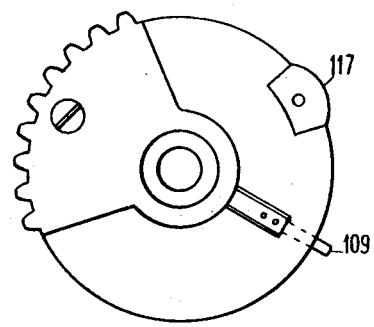
Figure 12:
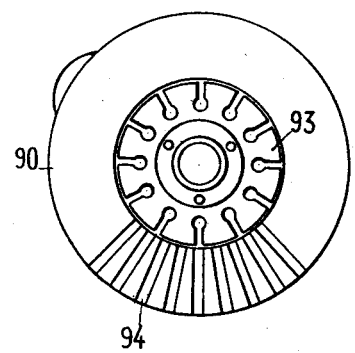
Figure 13:
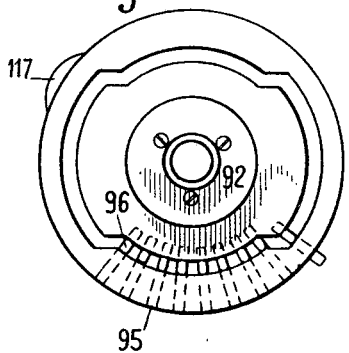
Figure 14:
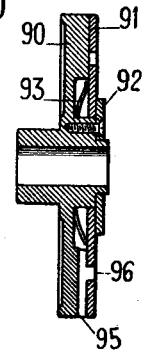
Figure 15:
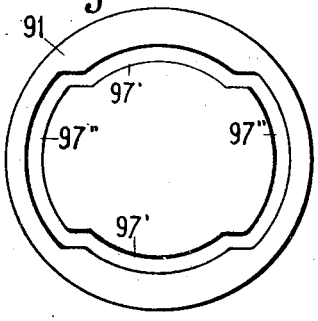
Figure 16:
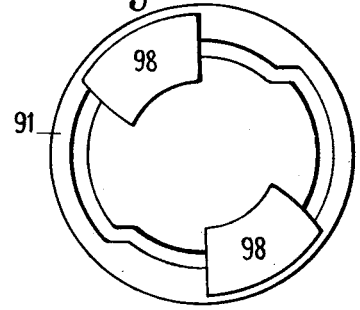

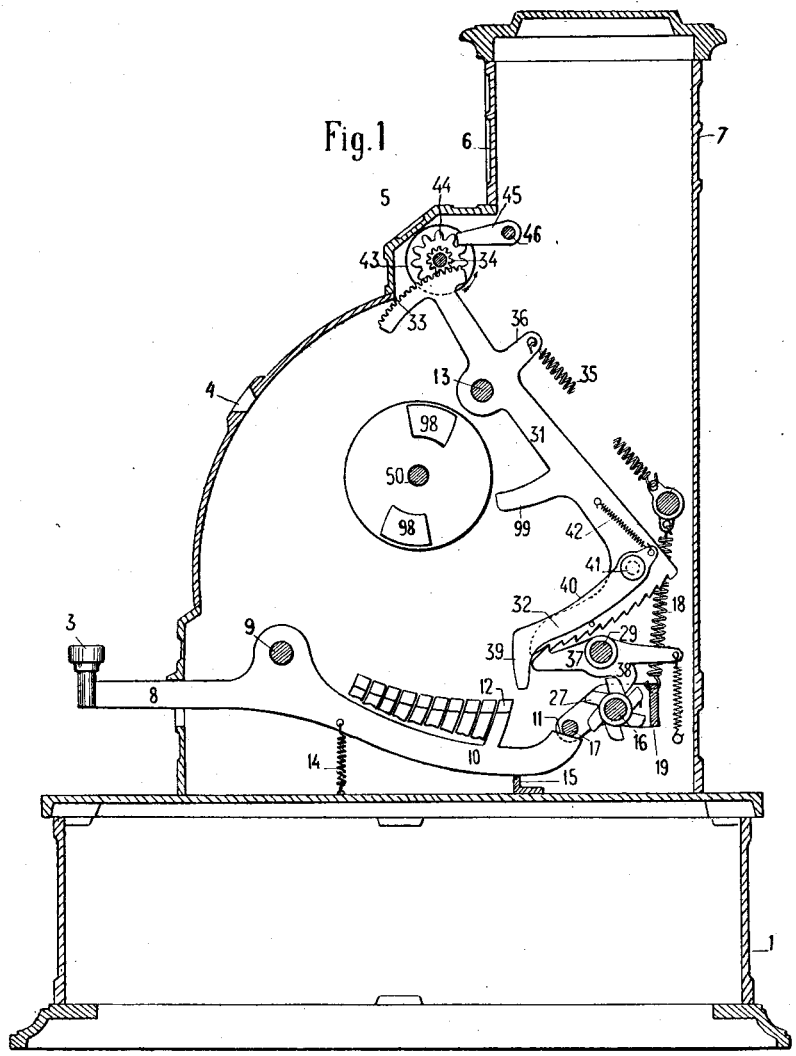

R. T. PISCICELLI.
CASH REGISTER WITH A SINGLE SET OF KEYS.
APPLICATION FILED JULY 2, 1909.
1,061,924.
Patented May 13, 1913.
12 SHEETS—SHEET 2.
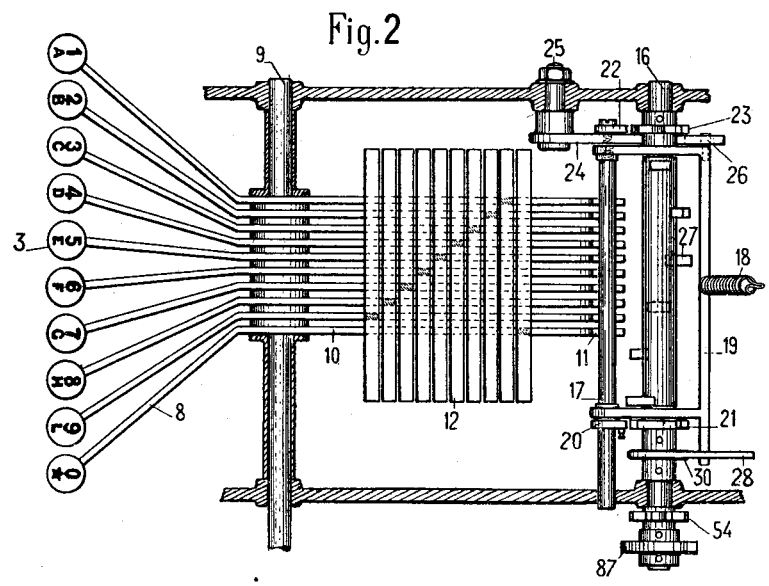
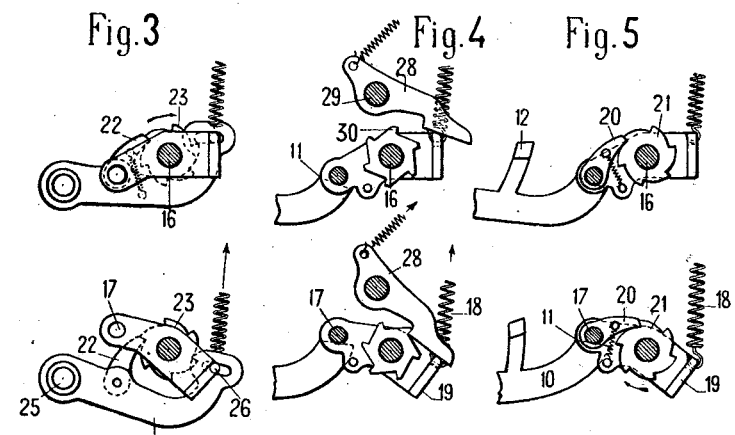
WITNESSES
INVENTOR
Roberto Tueggi Piscicelli
BY
ATTORNEYS R. T. PISCICELLI.
CASH REGISTER WITH A SINGLE SET OF KEYS.
APPLICATION FILED JULY 2, 1909.
1,061,924.
Patented May 13, 1913.
12 SHEETS—SHEET 3.
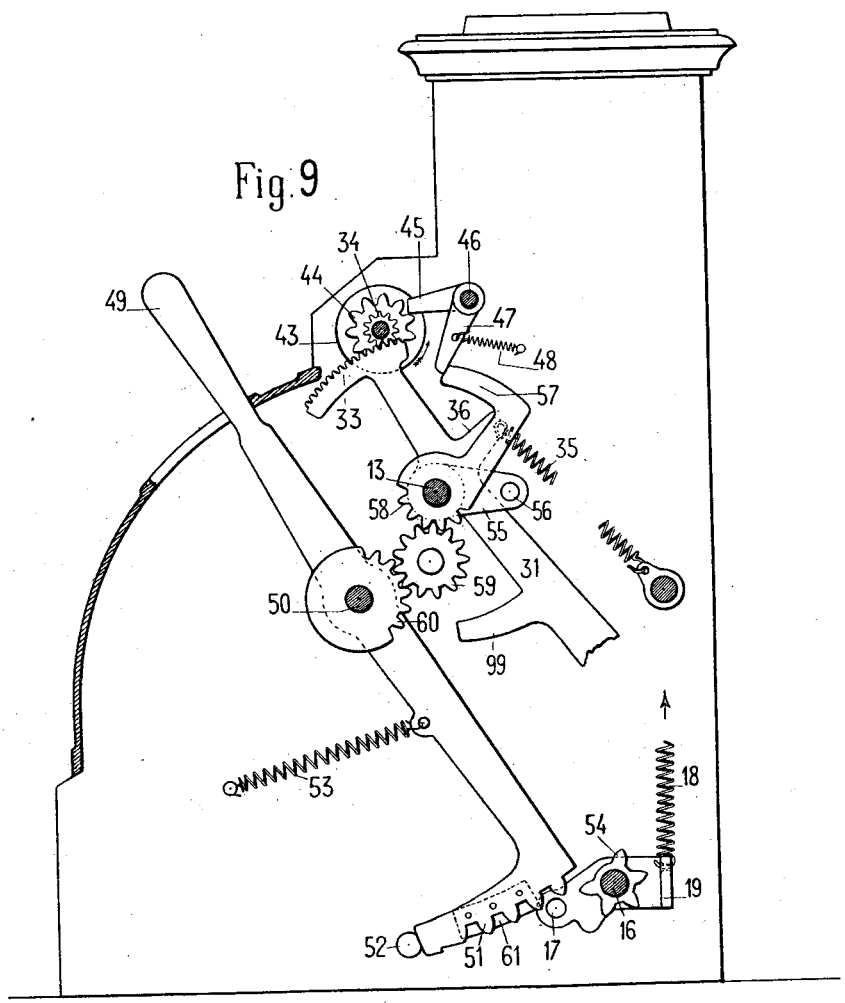
WITNESSES
INVENTOR
Roberto Taeggi Piscicelli
BY
ATTORNEYS

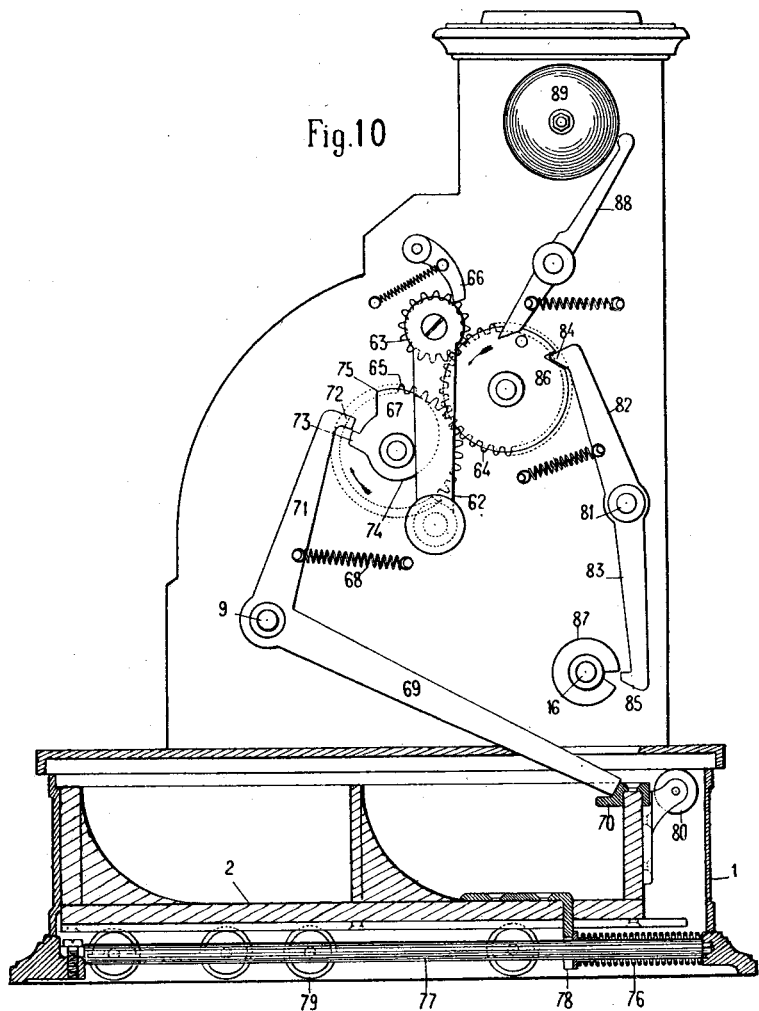

R. T. PISCICELLI.
CASH REGISTER WITH A SINGLE SET OF KEYS.
APPLICATION FILED JULY 2, 1909.

1,061,924.

Patented May 13, 1913.
12 SHEETS—SHEET 5.

WITNESSES
G. H. Emslie
J. P. Davis

INVENTOR
Roberto Taeggi Piscicelli
BY
Munn & Co.
ATTORNEYS

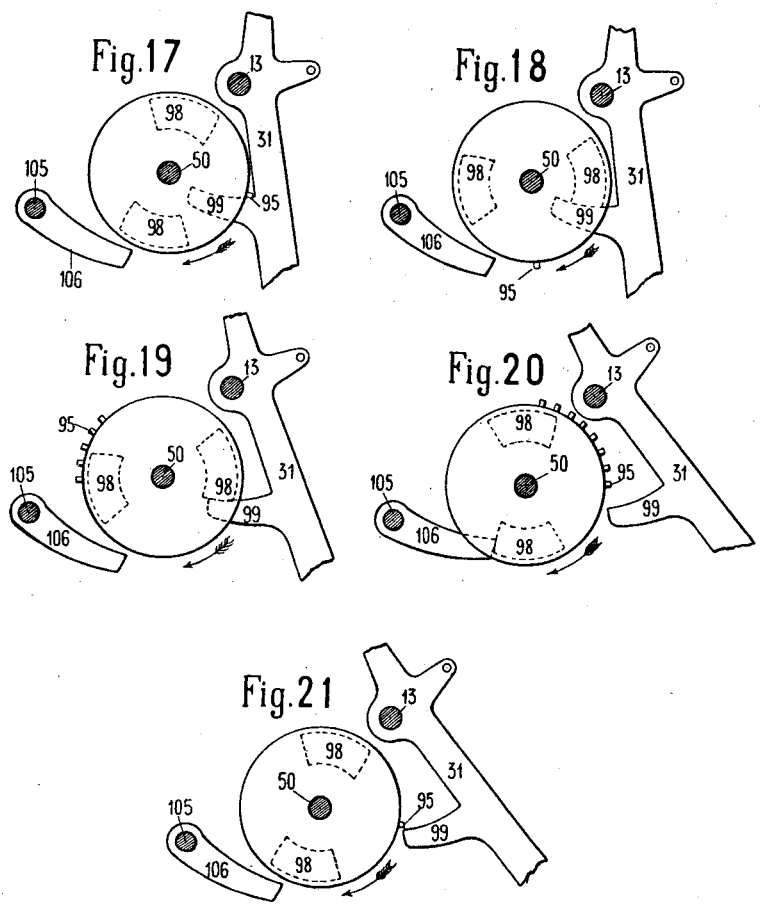

R. T. PISCICELLI.
CASH REGISTER WITH A SINGLE SET OF KEYS.
APPLICATION FILED JULY 2, 1909.

1,061,924.

Patented May 13, 1913.
12 SHEETS—SHEET 7.

WITNESSES

INVENTOR
Roberto Taeggi Piscicelli
BY
ATTORNEYS

R. T. PISCICELLI.
CASH REGISTER WITH A SINGLE SET OF KEYS.
APPLICATION FILED JULY 2, 1909.
1,061,924.
Patented May 13, 1913.
12 SHEETS—SHEET 8.
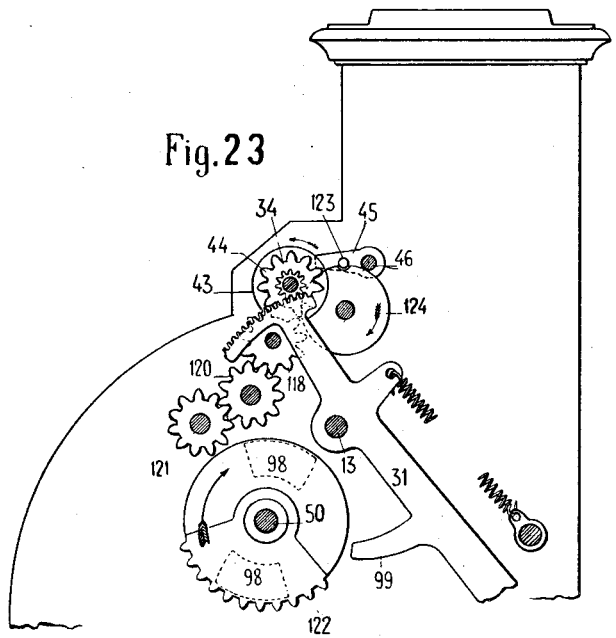
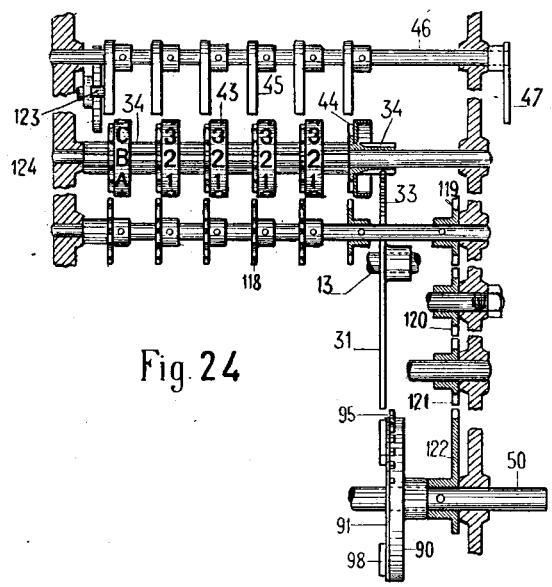
WITNESSES
INVENTOR
Roberto Taeggi Piscicelli
BY
ATTORNEYS

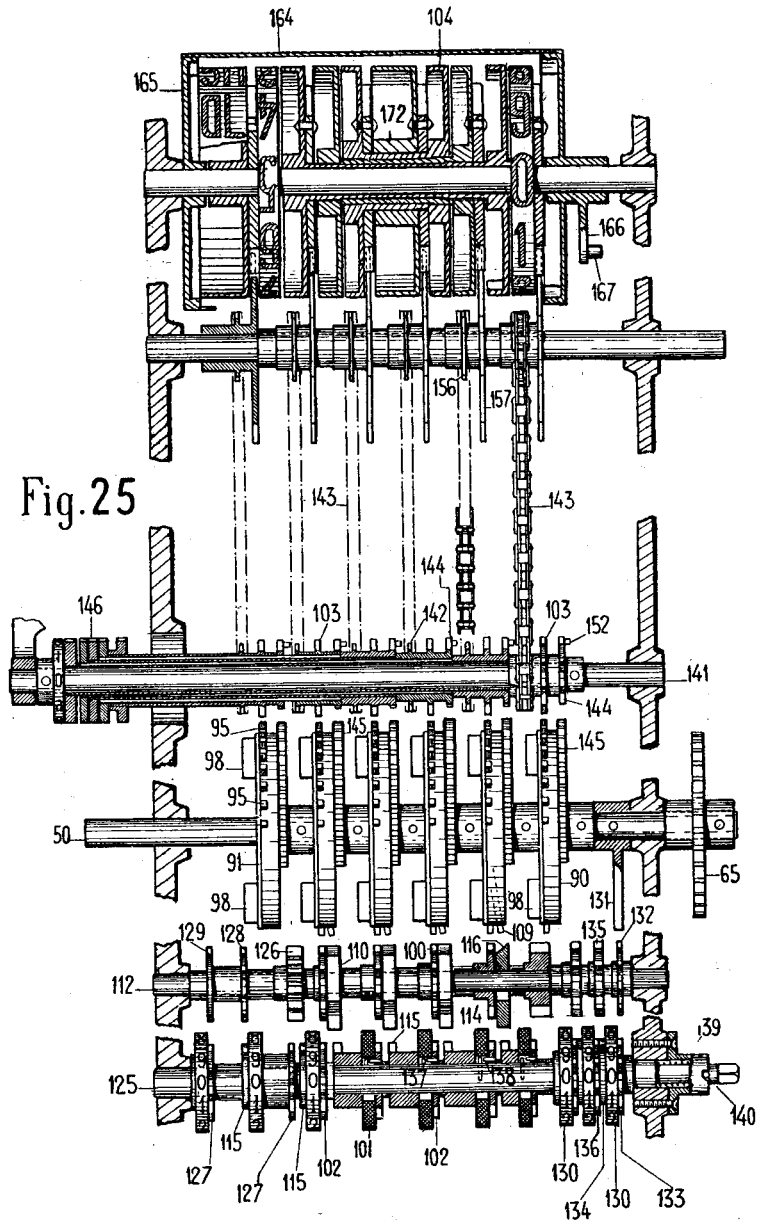

R. T. PISCICELLI.
CASH REGISTER WITH A SINGLE SET OF KEYS.
APPLICATION FILED JULY 2, 1909.

1,061,924.

Patented May 13, 1913.
12 SHEETS—SHEET 10.

WITNESSES
G. H. Emslie
J. P. Davis

INVENTOR
Roberto Taeggi Piscicelli
BY
Munn & Co
ATTORNEYS

R. T. PISCICELLI.
CASH REGISTER WITH A SINGLE SET OF KEYS.
APPLICATION FILED JULY 2, 1909.

1,061,924.

Patented May 13, 1913.
12 SHEETS—SHEET 11.

R. T. PISCICELLI.
CASH REGISTER WITH A SINGLE SET OF KEYS.
APPLICATION FILED JULY 2, 1909.

1,061,924.

Patented May 13, 1913.
12 SHEETS—SHEET 12.

WITNESSES
G. H. Emslie
J. P. Davis

INVENTOR
Roberto Taeggi Piscicelli
BY
Munn & Co.
ATTORNEYS

UNITED STATES PATENT OFFICE.

ROBERTO TAEGGI PISCICELLI, OF FLORENCE, ITALY.

CASH-REGISTER WITH A SINGLE SET OF KEYS.

1,061,924. Specification of Letters Patent. Patented May 13, 1913.

Application filed July 2, 1909. Serial No. 505,729.

*To all whom it may concern:*

Be it known that I, ROBERTO TAEGGI PISCICELLI, civil engineer, a subject of the King of Italy, residing at Via Pietrapiana N. 46, in the city of Florence, Italy, have invented certain new and useful Improvements in Cash-Registers With a Single Set of Keys, of which the following is a specification.

The present invention refers to new and useful improvements in that class of cash registers having a single set of keys, viz., only ten keys corresponding to the figures from 0 to 9, and by means of which numbers having any amount of figures can be summed up, for the arrangement is such that the key which is pressed down the first time puts into motion the mechanism for registering the higher units of the number; the key which is pressed down secondly puts into motion the mechanism for registering the units of the order immediately below, and so on. Therefore, it will be understood that if the machine has been arranged for registering values having a certain number of figures, each time that values requiring a lower number of figures are to be registered, the key corresponding to zero has to be pressed down as many times as there are missing units in the number. The same key board can also be utilized for indicating the several sale departments up to ten departments altogether, without increasing the number of the keys, the indication of the department preceding in this case the figure which corresponds to the higher unit, or following the figure of the lower unit of the value recorded.

The machine is arranged in such a way that, while the different keys which correspond to the figures of the number to be registered are successively lowered, an indicator shows the cashier through an opening the figures of the number which he is composing, so that if by mistake a wrong key is lowered the cashier is immediately informed thereof and can correct the mistake at once, for the lowering of the keys is only preparatory to the registration and therefore by turning a correcting lever everything can be brought back to the initial position, without the summing apparatus having been displaced and the registration can again be started with the composition of the value to be summed up.

The summing apparatus is actuated only when the operating handle provided in the usual way at the side of the machine is rotated, whereby the value already composed is summed, the ticket issued by the machine and the duplicate which remains inside of same, are both printed, the counter of the sales effected and the indicator of the amounts paid are caused to move, and to show to the buyer and to the cashier their indications after the indicator of the composition has been brought back to the initial position. At the end of the rotation of the lever the drawer, which must be kept closed for operating the machine, is also automatically opened.

The annexed drawings show by way of example a machine of this kind capable of registering numbers having 5 figures, or sales amounting up to $999.99 and of indicating ten different sale departments. Said machine is provided with a printing apparatus for the ticket which is issued to the purchaser and for the duplicate tape which remains in the machine for the control, and it is provided with the indicators which through windows provided in the front and rear wall of the machine show the purchaser and the cashier the amount of each sale, and with a drawer opening automatically at each operation for receiving the sum paid.

Figure 22:
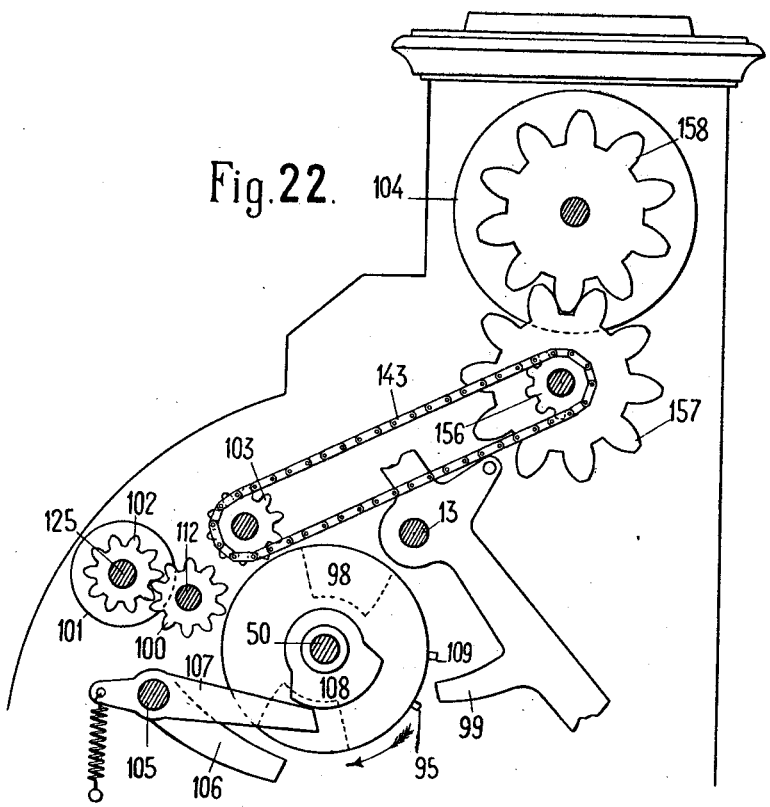
Figure 28:
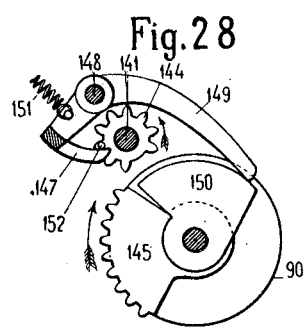
Figure 29:
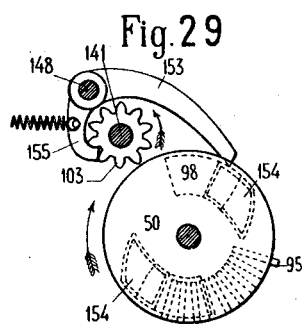
Figure 26:
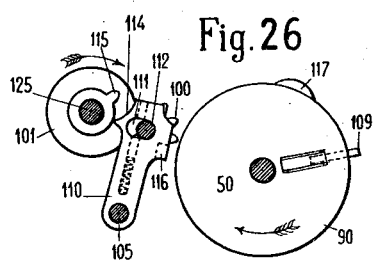
Figure 27:
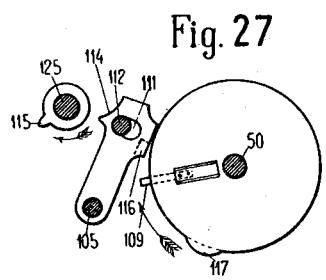
Figure 30:
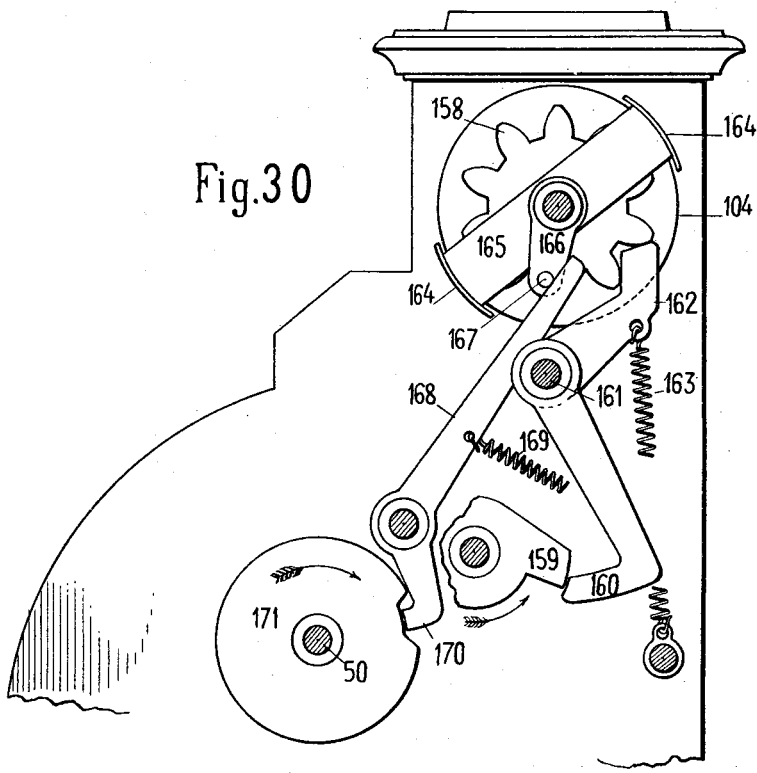
Figure 31:
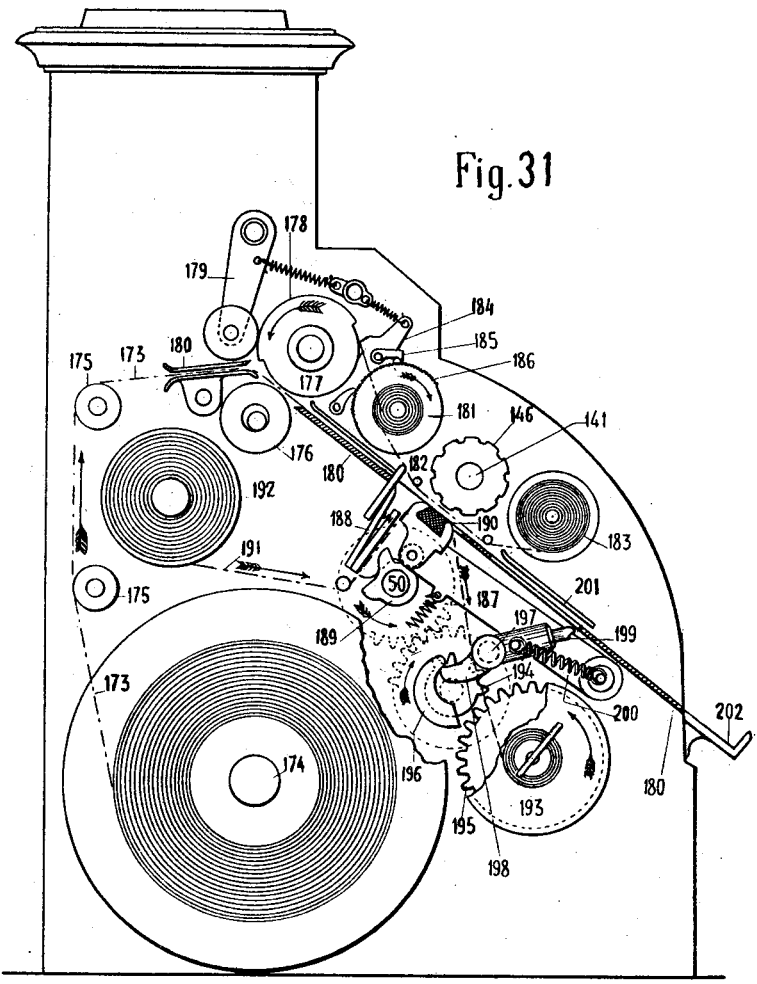

Figure 1 is a vertical section of the machine which shows a key with the corresponding value sector. Fig. 2 is a plan view of the key board with the shaft actuating the value sectors. Figs. 3, 4, 5, 6, 7 and 8 are details of the device for producing the movement of the said actuating shaft. Fig. 9 is a vertical section which shows the device for correcting the mistakes in the composition of the values. Fig. 10 is a side view of the machine, with the drawer in section and the gears transmitting the movement of the operating handle. Figs. 11, 12, 13, 14, 15 and 16 are details of the computing drums of the summing apparatus. Figs. 17, 18, 19, 20 and 21 show different phases of the summing apparatus. Fig. 22 shows the connection between the computing drums, the printing disks, the disks of the summing apparatus and the disks of the indicator of the amounts cashed. Fig. 23 shows the device for raising the value sectors. Fig. 24 is a plan view of a section passing through the axes of all the shafts of the indicator of the values composed; however for the sake of clearness the shafts are shown a little more spaced than in actual use. Fig. 25 shows in plan view a section passing through the axes of the shafts of the summing apparatus, of the printing device and of the indicator of the amounts cashed in which view however for the sake of clearness the axes are shown farther apart than when in actual use so that the toothed wheels do not come into contact. Figs. 26 and 27 illustrate the device for carrying over the tens. Fig. 28 shows the device for stopping the printing disks in the position corresponding to zero. Fig. 29 shows the device for stopping the disks at the end of the revolution. Fig. 30 shows the details of the device for stopping the movement of the indicators and actuating the shutters. Fig. 31 is a side view of the machine with the cover removed to show the printing device.

The machine, Figs. 1 and 10, rests upon a socket —1—, which contains the drawer —2— and viewed from the front viz. from the cashier's side who is attending to the registration it shows below a horizontal row of ten keys —3—; a little higher a longitudinal slot —4—, through which appear the indications of the summing apparatus and of the counter; another longitudinal slot —5— through which appear the figures corresponding to the key depressed, and lastly at the upper part the window —6— through which the cashier reads the amount cashed each time he has made a registration. The back side of the cash register, viz. the side turned toward the public, has a vertical wall having a single window —7— in its upper part in correspondence with the indicators of the amounts cashed.

The key board, Figs. 1 and 2, is similar to that of the typewriting machines and comprises a row of ten keys —3— carried by levers —8—, each revolving loose around a horizontal shaft —9— located inside the machine at the front part of same. The free ends of the arms —10— of the levers inside the machine end with small planes —11— which are all at the same distance from the shaft —9—, because the arms —10— are all parallel with each other and of the same length. Each arm carries a horizontal bar —12— which extends transversely above all the inner arms —10— of the other levers. All these ten horizontal bars are disposed according to a cylindrical surface, the axis of which coincides with the axis of the shaft —13—, for the purposes explained hereinafter. The keys are brought back to their position of rest by a spring —14— acting upon the inner arm —10— and are kept in said position by a stop —15— against which the arms —10— rest.

In proximity to the rear wall of the machine is a shaft —16—, on which is mounted an oscillating frame the transverse front bar —17— of which rests above the row of small planes —11—, so that lowering any one of the ten keys produces the same degree of oscillation of the said frame. The frame (see also Figs. 5 and 8) carries at one of its sides a pawl —20— which engages a ratchet wheel —21— with six teeth and keyed to the shaft —16—. A spring —18— secured to the transverse rear side —19— of the frame tends to keep it always with its side —17— against the planes —11—, so that after a key is lowered and released, the oscillating frame is brought back to its place by the spring —18—, while the key is brought back by the spring —14—. The angle, however, by which the pawl —20— causes the wheel —21— and with it the shaft —16— to rotate when any of the keys is entirely lowered and the front bar —17— lowered, does not amount to $\frac{1}{6}$, but to $\frac{1}{12}$ of a revolution, as shown in Figs. 5 and 8, so that when the key takes up again its position of rest, the pawl —20— would not be able to ride over a tooth of the wheel —21—, but the shaft —16— completes the rotation corresponding to a tooth or to a $\frac{1}{6}$ of revolution while the key goes up again and the transverse front bar —17— is lowered, and this, Figs. 3 and 6, under the action of another pawl —22— which pulls another ratchet wheel —23— having also six teeth and keyed on the other end of the shaft —16—. The pawl —22— is carried by an arm —24— which can turn around a pivot —25— fixed in the wall of the machine. In the free end of the arm —24— is provided a slot into which passes a pin —26— projecting at the end of the transverse rear bar —19— of the oscillating frame. When a key, and therefore the transverse rear bar —19— of the frame, is lowered, the pawl —22— rides upon the wheel —23— carried by the shaft —16—, which rotates under the action of the other pawl —20—, and performs a twelfth part of a revolution in the direction indicated by the arrow. When the key is released and the transverse rear bar —19— of the oscillating frame is raised, the pawl —20— rides idle on its wheel —21—, which on the contrary moves forward because it is carried by the shaft —16—, which under the action of the pawl —22— and of the wheel —23— is caused to rotate for a twelfth part of a revolution. Thus the shaft —16— can be turned the sixth part of a revolution by lowering one of the keys and letting it rise again, which is sufficient to bring into operative position one of the cams —27— arranged in a spiral line and at equal intervals on the shaft —16—. In the example shown in the drawing there are altogether six cams.

In order to prevent the shaft —16— from rotating a greater degree than the prescribed one, under the shock of the pawl —20— there is provided a hook —28—, Figs. 4 and 7, which can rock around a shaft —29— placed above the shaft —16— and which with its tail rests upon the rear cross-bar —19— of the oscillating frame, so that as soon as the key is lowered the hook falls upon a ratchet wheel —30— having six teeth and it leaves the same only when the key starts its return motion.

Upon the shaft —13—, Fig. 1, the axis of which is coincident with the axis of the cylindrical surface formed by the bars —12—, are mounted six arms —31— which at their lower end carry a sector —32— with eleven angular teeth and at their upper end a toothed sector —33— which engages with a pinion —34— having also eleven teeth. An antagonistic spring —35— secured to a lug —36— of the arm —31— tends to rotate the lower sector —32— forward. However, the forward motion of the same is prevented by a stationary pawl —37— rocking around the shaft —29— and having on its tail a lug —38— projecting downward. The cams —27— are located in the same planes with the lugs —38—, so that each sixth of a revolution of the shaft —16— brings a cam —27— in contact with one of the lugs —38— which is raised, and frees therefore the corresponding toothed sector —32—, which thus can move forward under the pull of the spring —35—. Now it has to be remarked that, when any of the keys are lowered, the shaft —16— rotates the sixth part of a revolution and the first of the cams —27—, on the left hand side, frees the corresponding sector. This sector in the machine shown in the drawing indicates the sale departments, so that the first key to be lowered is that on the head of which is marked the letter corresponding to the sale department. The forward motion of the arm —31— is limited by the tooth —39— which projects downward at the fore end of the sector —32— and it strikes against the bar —12— which has been raised by the key. It is to be remarked that the tooth —39— is not directly carried by the sector —32—, but by an arm —40— fastened to the side of the same and rotatable around a pivot —41—. A spring —42— keeps the arm in its normal position against a stop provided for this purpose on the sector —32—. In order to secure an accurate position of the arm —31— at the end of the stroke, the various parts of the device are arranged in such a way that the stationary pawl —37— leaves the sector —32— before the bar —12— has reached its full height, or rather before the key is completely lowered; therefore, when a key is completely lowered, the pawl of the sector which is actuated is raised and the sector rests with its tooth —39— against the corresponding bar 12. Afterward when the key starts again to rise, or rather when the bar 12 is lowered, the lug —38— moves downward and the pawl —37— strikes against the sector —32— in the space between two successive teeth; so that during the lowering of the bar 12, and at the moment in which the tooth —39— is freed from said bar, the sector again moves forward a little until the pawl comes into contact with the corresponding tooth.

From the aforesaid it will be understood that each time a key is lowered the toothed sector —33— is rotated, the position of the bar 12 causing a movement of the toothed sector proportional to the value of the figure marked on the head of the key. The toothed sector —33— carries in its movement the pinion —34— with which is connected a disk —43— bearing marked on its periphery the figures from 0 to 9 or the letters of the departments which appear through the window —5—; moreover the same has a blank space of equal width which corresponds to the position of rest, altogether eleven spaces, viz. as many as there are teeth in the pinion —34— and in the sector —33—, so that a sector has to rotate by a space in order to cause the cipher naught to appear. After having obtained with the first lowering of a key and the displacement of the corresponding sector the indication of the department, the first figure of the value to be registered is got by a second lowering of a key, which acts on the second of the arms —31— beginning from the left hand side, because it is the second cam —27— which raises the lug —38— which lies in its plane. It is to be remarked that if the second key lowered is the same lowered the first time, the bar —12— would strike against the tooth —39— of the first arm which, after the lowering of same, had moved forward a little and this is the reason why the tooth —39— has been mounted on the oscillating arm —40—, which allows of the tooth being raised by the bar without the sector —32— being displaced, which remains in its place, while the remaining sectors are brought successively to their places.

It could happen that the tooth —39— by striking forcibly against the bar —12— would rebound and thus cause the toothed sector —32—, and with it the disk —43— to move backward one or more teeth. In order to prevent this cause of mistakes each disk —43— is connected to a toothed wheel —44—, against which abuts the free end of an arm —45—, Figs. 1 and 24, oscillating around a shaft —46—; there are as many arms —45— as there are disks —43—, viz. six altogether, and all these arms move all together and also with another arm —47—, see Fig. 9, which is near one of the ends of the shaft —46—, around which they oscillate. The arm —47— is brought back in its position of rest by a spring —48— which causes the arms —45—to rest against the teeth of the wheels —44—; it will be understood that when the toothed sectors —33— move forward and the disks —43— turn in the direction indicated by the arrow, Fig. 9, the corresponding arms are raised each time a tooth passes underneath same, leaving the pinion free to rotate. But when through the effect of a shock the pinion receives an impulse in opposite direction, the teeth of the wheel will meet the end of the arm —45— which enters between same and thus prevents the back rotation of the disk.

The disks —43— show the cashier the letters and the figures corresponding to the keys he has depressed. If he notices a mistake, he can easily correct it in the following way: In proximity to the right hand side of the machine is a correcting lever 49 which projects out of the casing through a vertical slot. The correcting lever turns around a shaft —50— and carries at its lower end a toothed sector —51— which rests against a stop —52—. The lever is kept in this position by an antagonistic spring —53—. The shaft —16— carries at its right hand end a toothed wheel —54— which lies in the same plane with the sector —51—. The toothed wheel —54— has five teeth and a space between the first and last tooth corresponding to a sixth tooth which is missing and when the shaft —16— is in the position of rest, viz. when none of the keys has been lowered, the teeth of the sector —51—, when the lever —49— is rotated, passes into the space between the first and the last tooth of the wheel —54— without moving same. If, on the contrary, one or more keys have been lowered, or rather one or more of the sectors —32— have moved forward, then by rotating the lever —49— the sector —51— is brought in engagement with the teeth of the wheel —54— and causes the latter to rotate as much as it is necessary for causing the shaft —16—, to resume its position of rest again. Then by releasing the lever —49— the spring —53— returns it to the initial position, while the teeth of the sector —51— pass freely in the empty space between the first and the last tooth of the wheel —54— without communicating any further movement upon the shaft —16—. The lever —49— during its movement besides bringing the shaft —16— back to its initial position, has to accomplish still another operation, viz. it must raise all the arms —31— which were lowered, bringing them back into their initial position. For this purpose at the ends of the shaft —13— are fastened two arms —55— connected with a cross bar —56— which passes beneath all the lugs —36— projecting from the arms —31—. Besides that at the right end of the same shaft —13— is fixed a piece which at one side ends with a bent arm —57— and on the other side is formed as a portion of a toothed wheel —58—, which by means of another intermediate toothed wheel —59— is moved by the toothed sector —60— which rotates around the shaft —50— connected with the lever —69—. It will be understood that by lowering the lever —49— the two arms —55— and the cross bar —56— connected therewith are rotated also and the cross bar —55— meets successively all the lugs —36— of the arms —31— which have been lowered, and bring them back to the initial position, while when the lever —49— returns to the position of rest, the cross-bar —56— moves away from the lugs, leaving the arms —31— free to be again lowered. However, the backward motion of the arms —31— would not be possible until the arms —45— abut with their ends against the teeth of the wheels —44—. This stop is taken away by the lug —57— which, when the lever —49— is lowered, strikes against the arm —47— and causes the arms —45— to rise leaving free the wheels —44—. While the correcting lever 49 is in an intermediate position it is necessary to avoid starting a registration by lowering any one of the keys. For this purpose to the side of the toothed sector —51— is fastened a piece —61—, the lower edge of which forms an arc of circle having the center on the axis of the shaft —50—. As soon as the rotary movement of the lever —49— has been started, this piece will rest with its lower edge against the transverse front bar —17— of the oscillating frame and prevent the raising of the said bar and thereby also the lowering of any one of the keys. The stationary pawl —37— rides freely over the sectors —32— while they are moving backward, but do not allow them to move forward when they have reached again the initial position and thus all return ready for starting a new registration.

After having lowered six keys, the machine is ready for accomplishing the registration and the sum of the value which by the disks —43— is shown behind the window —5—. The registration is accomplished, Fig. 10, by causing the handle —62—, which projects from the right side of the machine, to make two revolutions and to put into motion the devices described hereinafter. On the pivot of the handle —62— is mounted, a toothed wheel —63—, which engages with a toothed wheel —64—, the diameter of which is twice greater, so that two complete revolutions of the handle correspond to a single revolution of the wheel —64—, which on its turn transmits the movement to a twin wheel —65—. With the wheel —63— engages a stationary pawl —66— which prevents the backward motion of the handle —62—. With the wheel —65— is connected a disk —67— the periphery of which has the shape shown in Fig. 10 and which serves for actuating the drawer in the manner described hereinafter. An oscillating angle-lever is mounted on an end of the shaft —9—, and is kept in place by an antagonistic spring —68—; the lower arm —69— of said lever is straight and abuts with its end against a stop —70— provided at the rear wall of the drawer —2—. The upper arm —71— is bent at its free end which is shaped as a tooth —72—. When the machine is at rest with the drawer closed, all the parts are in the position shown by Fig. 10; on turning the operating handle the disk —67— rotates in the direction indicated by the arrow and beneath the tooth —72— passes freely first the projection —73—, then when the arc —74— which connects the base of the projection —73— with the top of the tooth —75—, arrives at the tooth 72, the tooth —72— begins to be raised and with it the arm —69—, until at the moment when the tooth —72— arrives above the edge of the tooth —75— the end —69— abandons the stop —70— and the drawer remains free to come out.

The drawer is pushed out by a spring —76— wound around a rod —77—, on which slides a fork —78— projecting from the bottom of the drawer and against which acts the spring —76—. In its course the drawer is guided below by the rollers —79— and on the top by the rollers —80—. As soon as the drawer has come out pushed by the spring —76—, the arm —69— drops behind the rear wall of the drawer and the tooth —72— falls into the notch comprised between the teeth —73—75— and at the end of the course its lower face rests against the upper face of the tooth —73—; therefore it is not possible to rotate the handle 62 further, until by pushing the drawer back and thereby raising the arm —69—, the tooth —72— is disengaged from the notch in the disk —74— and brought in the position shown by the Fig. 10. Besides that as soon as the rotation of the handle —62— has been started, and as long as the same is not completed, no displacement of the shaft —16— must be allowed, and for this purpose a catch is provided oscillating around the shaft —81—, and consisting of a two armed lever —82—83— each arm of which ends with a tooth —84—85—. In the position of rest the tooth —84— lies within a notch cut out in the edge of a disk —86— which, when the handle is rotated, turns in the direction indicated by the arrow together with a toothed wheel —64— to which it is fastened. The other tooth —85— in the position of rest lies in front of a notch provided on the edge of a disk —87— keyed upon the shaft —16—. The shape of the tooth —84— is such that, when the disk —86— begins to revolve in the direction shown by the arrow, it escapes from the notch and raises the arm —82— causing the arm —83— to move forward and the tooth —85— to enter the notch of the disk —87—. While the operating handle performs two revolutions, the disk —86— performs one revolution only and therefore only at the end of the registration the tooth —84— falls again into the notch of the disk —86— and causes the tooth —85— to come out of the notch of the disk —87— thus freeing the shaft —16—. An antagonistic spring causes the tooth —84— to rest against the edge of the disk —86— during the revolution of same and then to fall into the notch, which corresponds to the position of rest. It should be remarked that as soon as the rotation of the shaft —16— has been started, the continuous edge of the disk —87— comes beneath the tooth —85—, so that the tooth —84— is compelled to remain in the notch of the disk —86— and it is no longer possible to rotate the handle —62—. A pin fixed to the disk —86— displaces at each revolution of the wheel —64— the hammer —88— which pulled by an antagonistic spring causes the bell —89— to ring.

The summing apparatus is formed (Fig. 1) by the oscillating arms —31— mounted upon the shaft —13— and by a series of drums, which hereinafter shall be termed computing drums, which are mounted upon the shaft —50— and each of which in combination with the aforesaid oscillating arms causes one of the disks of the summing apparatus to move forward. These disks appear through the opening —4—, and the movement of the disks is proportional to the rotation of the corresponding oscillating arm. Each computing drum, Figs. 11 to 16, consists in a disk —90— keyed on the shaft —50— and in a disk —91— loose on the same shaft and kept against the disk —90— by means of a ferrule —92—. A flat spring —93— placed between the two disks causes the disk —90— to drag with it when rotating the disk —91— when there is no outer resistance which prevents this movement. The fixed disk —90— is provided with nine radial slots —94—, in each of which is placed a sliding pin —95— which on the side turned toward the disk —91— carries a projecting pivot —96— which enters an annular groove cut in the face of the disk —91— turned toward the disk —90—. This groove is formed by four arcs, two of which —97'— are nearer the center than the other two —97"—. The four portions are suitably connected with each other to form a continuous annular groove and all of them have the same angular width, which is such that each of them comprises eight of the radial grooves —94— of the fixed disk —90—. The two inner arcs of the groove are in such a position and the projecting pivots —96— are fixed on the pins —95— in such a manner that when the pivots are in one of the said inner arcs —97'— the pins do not project out from the periphery of the drum and are located entirely within the radial grooves which have the same length as the pins, but, on the contrary, when the pivots, are on the outer arcs —97"—, the pins project with their ends from the periphery of the drum. The shape of the groove —97'—97"— clearly shows that during a complete revolution of the disk —91— with respect to the disk —90— all the pins come out twice and are retracted twice into their grooves.

Now on the outer face, Figs. 17 to 21, of each of the movable disks —91— are provided two stopping blocks —98—, which lie in the plane of a lug —99— projecting from the corresponding oscillating arm —31—. The said lug advances more or less beneath the stopping block according to whether the arm —31— is in a more or less advanced position. However, after having lowered the oscillating arms and before starting the revolution of the operating handle Fig. 17, the stopping blocks have not yet come into contact with the lugs, they meet them after the disks have rotated a certain distance, Fig. 18, so that when the handle is rotated, the shaft —50— begins to move and carries in its movement the fixed disks —90— together with the movable disks —91—. In the moment in which the stopping blocks —98— meet the lugs —99—, the arms —31— begin their back motion in the manner described hereinafter, and it will be understood that the lug of that arm which was the most advanced will rest the longest against the corresponding stopping block. Now while the stopping block, Fig. 19, rests against the corresponding lug, the movable disk —91— cannot follow the rotation of the fixed disk —90—, it therefore lags behind and into the outer arc —97"— of the annular groove pass as many pins as there are units in the figures which the corresponding disk of the summing apparatus has to register.

The pins as they come out from the radial grooves engage, Fig. 22, first with the toothed wheels —100— which communicate the movement to the disks —101— of the summing apparatus by means of the toothed wheels —102— connected with the same, and with which they engage continually, and then with the toothed wheels —103—, from which the movement is transmitted, as it will be explained hereinafter, to the printing apparatus and to the disks —104— of the indicators, which show the public and the cashier the amount of the sum cashed, and provisions are made to the end that in the arc comprised between the contacts with the two wheels —100— and —103— are not more than eight pins. The movable disk is again stopped in the following manner: Upon a shaft —105— parallel with the shaft —50— are mounted arms —106— each of them in correspondence with a drum, and further an arm —107— which with its end rests upon the edge of a cam —108— keyed on the shaft —50—. When all the pins have ceased to act upon the toothed wheels, which move the summing apparatus the indicators and the printing part, the arm —107— is released by the cam —108— and the arms —106— rise, Fig. 20, and meet the stopping blocks —98— stopping the movement of the disks —91— until all the pins which were still in the radial grooves have come out and are then again retracted except the last pin, Fig. 21, which remains projecting, because, as previously stated, the width of each of the arcs of the annular groove is such that it comprises only eight pins and when eight of them are in the inner arc, one of them still remains in the outer arc.

When the revolution of the shaft —50— has begun and as soon as the stopping block —98— meets the lug —99— and causes the first pin to come out, the last pin which had remained outside is retracted again and as many pins come out as there are units in the figure to be registered. If the figure to be registered is a nine, it would seem at the first sight that it is not possible to cause the nine pins to come out, but this is not the case, because at the moment the eighth pin comes out, the first pin has already passed beyond the point of contact with the wheel —103— and has finished acting on the mechanism, so that it can be retracted while the ninth pin is coming out, which on its turn acts on the two transmission wheels —100— and —103— and then it remains projecting at the end of the operation, viz. when the piece —106— has caused the other pins to reënter. If, on the contrary, a naught must be registered, it happens that the piece —106— meets the stopping block —98— and causes the last pin which was projecting to reënter just before it engages with the wheel —100— and in this moment the first pin which comes out has already passed beyond the point of contact with the wheel —103— and therefore it does not act in any way on the registering mechanisms. It will be easily seen that while the disk —90— in a registration performs a revolution, the disk —91— performs only half a revolution and therefore there are two stopping blocks —98— of which in a registration it is always the same which acts in all the stops. The other stopping block enters into action only for the successive registration.

The transferring of the tens from one order of unity to the other, each time that one of the disks of the summing apparatus has moved forward by ten places, is obtained by means of a pin —109—, Figs. 11, 25, 26 and 27, which permanently projects from the periphery of the computing drum and is connected with the fixed disk in such a way that it can deviate to the left of its plane and place itself in correspondence with the toothed wheel —100—, Figs. 22 and 26, which corresponds to the units of the next higher class. The displacement to the left hand side is obtained by means of an arm —110— oscillating around the shaft —105—. In the head of this arm is provided an elongated slot —111—, through which passes the shaft —112—, the diameter of which corresponds to the width of the said slot. A pin —113— pushed by a spring located in a cavity provided in the arm —110— keeps said arm fixed in the position in which it is brought. Normally the said arm is turned toward the front, Fig. 26, viz. away from the computing drum, however its head turned, toward the front has a curved surface —114—, against which slides a finger —115— which rotates with the disk —101— with which it is connected. Therefore, each time that the disk —101— has performed a complete revolution, the finger —115— causes the arm —110— to move toward the computing drum, Fig. 27. The part —116— of the head of the arm —110— turned toward the drum has a wedged shape so that it displaces laterally the pin —109— when it meets same on its way and keeps it displaced in such a way as to act on the toothed wheel —100— of the summing device of the units of the next higher order which follows on the left, causing the same to move forward by a tooth; said displacement having been effected the pin —109— is released and resumes its normal position. At the same time a projecting nose —117—, which comes out from the periphery of the fixed disk —90—, meets on its turn the head of the arm —110— and raises it away from the drum until it is again brought to its position of rest, in which it is in the path of the finger —115—. On the different summing drums the pins —109—, which produce the passage of the tens, are disposed in such a way that they work one after the other beginning from the units of the lower order, and this for giving the possibility of accomplishing the passage of a unity in the disks of the higher order, when it is exactly the passage of a unity on the disk of the lower order produced by the pin —109— which causes the same to complete a revolution causing it to pass naught.

The contemporaneous back motion of all the arms —31—, Figs. 23 and 24, takes place in the following manner: Each one of the disks —43— which indicate the figures already composed, is connected with a toothed wheel —44— with ten teeth, and a space corresponding to an eleventh tooth which is missing. In the same plane of these wheels, and mounted upon a shaft parallel with the shaft which carries the indicating disks, are as many toothed wheels —118— with ten teeth and a space corresponding to a tooth which is missing, each connected with a wheel —119— mounted upon the same axis and engaging with a wheel —120— which by means of another wheel —121— receives the movement through a toothed sector —122— keyed on the shaft —50—. It will be understood that when the arm —31— is lowered, the wheel —44— rotates and therefore in the space corresponding to the missing tooth of the wheel —118— comes a tooth of the wheel —44—. As soon as the revolution of the wheel —119— has begun, the wheel —118— meshes with the wheel —44— and causes rotation of the same until it is brought back in the position of rest shown in Fig. 23, or rather until it meets the space of the missing tooth, whereon the wheel —118— completes its revolution, while its teeth pass freely in the said space without further moving the wheel —44— which has brought back the arm —31— to its original position.

All the parts are arranged in such a manner that when the sector —122— meets the wheel —121—, the stopping block —98— strikes against the lug —99— which stops the movement of the corresponding disk —91—. The wheels —44—, while the pawls —45— abut against their teeth, even through turning the operating handle —62—, would not allow of the arms —31— being moved backward, but they are freed in the following way: From the side of one of the pawls —45—, Figs. 23 and 24, projects a pin —123— which rests in a notch provided in the periphery of a disk —124—, which at every two revolutions performed by the handle —62— performs one revolution. As soon as the rotation of the disk —124— has begun, the pin —123— comes out from the notch and passes over the outer edge of the disk thus raising the pawls —45— which free the wheels —44— for the whole time of the operation, so that the same can return to naught without hindrance of any kind. At the end of the revolution of the handle the notch of the disk —124— comes again beneath the pin —123— and the pawls —45— again prevent any back motion of the wheel —44— when the keys are touched.

From the aforesaid it clearly appears how the computing drums by means of the couple of wheels —100— —102— impart the movement to the disks —101— mounted on the shaft —125— rotating same to a degree proportional to the value of the figure to be registered and how is accomplished the transfer of the tens from one order of units to the units of the next higher order. The machine shown in the drawing allows the registration of numbers having five figures, viz. up to $999.99, however the summing apparatus registers sums of seven figures, namely up to $99999.99. Therefore, there are two more disks —101—, the two first ones on the left in Fig. 25, which are not directly actuated by the summing drums. The second of said disks is caused to move forward by a unity in the following way: The wheel with the finger —115— of the third disk —101— is fastened on the right hand face of same and moves a thick toothed wheel —126—, with which engages a toothed wheel 127 having ten teeth similar to the wheels —102—. This wheel is connected with the second disk —101— which each time it performs a revolution, by means of the finger —115— provided on its left hand side, causes to move forward a wheel having ten teeth —128— which wheel is mounted on the shaft —112— and connected with a disk —129— which carries one tooth only. This tooth at every revolution meets another wheel having ten teeth —127— connected with the first disk and therefore it causes the said wheel to move forward by one unity.

On the same shaft —125—, on which are mounted the disks —101— of the summing apparatus are mounted also the disks —130— of the numerator, to which the movement is transmitted by an arm —131— which rotates together with the shaft —50—. At every revolution the arm —130— causes to move forward by a tooth the toothed wheel 132 with ten teeth. The wheel 132 is loose on the shaft —112— and permanently engages with a twin toothed wheel —133— which is mounted loose on the shaft —125— and connected with the first of the disks —130— of the numerator which in Fig. 25 is shown on the right hand side. The same disk —130— is connected with a disk —134— which carries a finger, which at each revolution causes to move forward by a tooth a toothed wheel 135 having ten teeth and mounted loose on the shaft —112—. The thickness of this wheel is twice that of the disk —134— and it engages also permanently with a toothed wheel —136— connected with the second disk of the numerator, which therefore moves forward by a tooth each time that the first disk has performed a revolution. The movement of the third disk is produced in a similar way and so on.

All the indicating disks mounted on the shaft —125—, viz. those —101— of the summing apparatus as well as those —130— of the numerator, are brought simultaneously to zero with a single movement in the following manner: The disks —101— and the disks —130— do not fit exactly on the shaft —125—, but they leave an annular groove in which rotate pins —137— projecting from the shaft —125— in radial direction and all in a straight line. From the wheels —102— —133— —136— connected with the indicating disks —101— and —130— project in the inner part of the aforesaid annular groove other pins —138— parallel with the axis of the shaft —125—. Now the shaft —125— can slide axially in its bearings which are provided in the side walls of the machine, and also in the sleeves of the disks and of the wheels which it carries and is kept in the normal position of rest shown by the figure by a spring —139—. The end which projects on the right hand side is provided with a transverse pin —140— which is placed in a groove provided in the sleeve which contains the spring —139—. The said groove has such a shape that by turning the shaft by means of a key, acting on its square end, the pin sliding on the groove and overcoming the resistance of the spring —139— causes the shaft to shift toward the right hand side and brings the pins —137— back in the plane of the pins —138—, so that by turning the shaft —125— the pins —137— meet the pins —138— and drag with them all the disks out of place and at the end of the revolution, viz. when the pin —140— falls again into the groove, all the disks are brought back to naught.

The pins —95— of the summing drums after having driven the disks of the summing apparatus act, as stated hereinbefore, upon the printing disks and the drums of the indicators of the sum cashed in the following manner: On the shaft —141—, Figs. 22 and 25, parallel with the shaft —50— in front of each of the summing drums is placed a sleeve which carries three wheels, of which one —103— having ten teeth receives the movement from the pins —95—, another —142— having also ten teeth, is that on which is wound the linked chain —143— by means of which the movement is transmitted to the drums —104— of the indicators, and a third one —144— which is in the plane of the sectors —145— fastened to the disks —90—, serves for bringing back to naught, as explained hereinafter, the printing disks and the drums of the indicator before the pins —95— transmits the values after every registration. Each one of the sleeves which carries the group of the aforesaid three wheels is mounted upon a tube which at its left hand end carries one of the printing disks —146—. There are as many tubes as sleeves with groups of three wheels except one which is carried directly by the shaft —141—. All these tubes are passed one upon the other loose between each other and loose on the shaft —141—. The arrangement is such that the printing disks have the reversed disposition of the sleeves with which they are connected, viz. the first printing disk on the left hand side by means of the axis is connected with the first sleeve of the right hand side, the second disk beginning from the left with the second sleeve beginning from the right by means of the first tube and so on. All these tubes with the respective sleeves, being loose one upon the other, it could easily happen that one of them, when in motion, might carry in its movement one of those which must not move during its revolution. In order to prevent this two different categories of stops are provided; one for stopping the disks and the groups of the three wheels when they have reached the position of naught and the other for stopping the movement of the sleeve in the exact position in which it is brought by the pins —95—. Therefore, it must be explained in what manner the printing disks and the drums of the indicators, which move together, are brought back to naught.

As already stated, on the side of each of the computing drums is fixed a toothed sector —145— which is in the plane of the wheel —144— of the corresponding sleeve with the group of three wheels. The wheel —144— has nine teeth and a space corresponding to a tenth tooth which is missing, as is clearly shown in Fig. 28; in the position of the rest of the space of the missing tooth is in such position that by turning the sector —145— it passes freely with its teeth through the said space without imparting any movement to the wheel —144—. If, on the contrary, the sleeve is turned, the sector —145—will come in gear with the wheel —144— and cause the same to turn until it is brought back in the position shown Fig. 28, whereon the sector freely moves further leaving at rest the wheel —144—. The stopping on naught is obtained by means of a group of pawls —147— all connected together and oscillating around a small auxiliary shaft —148— parallel to the shaft —141—. With the group of pawls is connected an arm —149— which with its free end rests upon a cam —150— fastened to the computing drum of the right hand side. An antagonistic spring —151— forces the arm —149— to rest against the said cam. The orientation of the cam —150— with respect to the toothed sector —145— is such that the whole time, in which the toothed sector can engage with the wheel —144—, the pawls —147— remain in the position shown by Fig. 28 and, therefore, when the wheel reaches the position of rest in any moment, the pin —152— which projects from one of its sides, strikes against the pawl —147— and prevents any further displacement, while the sector prosecutes its rotation passing perfectly free. On the contrary, the stopping of each single wheel, after it has turned a distance corresponding to the value of the figure to be printed, is obtained by means of six independent pawls one for each wheel, mounted also on the auxiliary shaft —148—. Each of said pawls consists of an angle lever which can turn around the shaft —148— and of which an arm —153— slidingly engages a block —154— fastened on the face of the corresponding drum. The position of the said block is regulated in such a way that the moment the forward movement of the wheel —103— is finished, the arm —153— is raised in the position shown by Fig. 29 and the other shorter arm —155— enters between two teeth of the wheel —103— preventing the further advancing of same. The wheels are then freed at the moment in which the sleeves have to be brought back to naught. To the indicators —104— of the amounts cashed the movement of the chains —143— is transmitted, Figs. 22 and 25, by means of the pinion —156— which is fastened to a toothed wheel —157— having also ten teeth and which engages with a twin wheel —158— which turns together with the drum —104—.

While the machine is at rest the drums of the indicators must keep the position they have taken up without moving until a new registration is effected. For this purpose, Fig. 30, on the right wall of the machine is provided a cam —159— which at every two revolutions of the operating handle —62— performs one revolution and has a far projecting tooth, which in the position of rest is located as shown by Fig. 30; against this tooth rests in this position the tooth —160— of an arm oscillating around the shaft —161—, on which are mounted together with the arm —160— six arms —162— the ends of which enter between the teeth of the wheels —158— fastened with the drums —104—. When the handle —62— begins to rotate, the tooth —159— escapes from beneath the tooth —160— and the end of the arm —162— under the action of the spring —163— moves away from the wheel —158— leaving the corresponding drum free to rotate. While the drum —104— turns, it will be convenient to cover the windows —6— and —7— through which appear the figures marked on the drum. For this purpose the shutters —164— are employed which are two longitudinal plates having the same width as the windows and carried by an oscillating frame —165—.

The oscillation of the frame is produced in the following way: To the frame —165— is fixed a lug —166— which carries a projecting pin —167— which rests against the long arm —168— of an angle lever, which is under the action of an antagonistic spring —169— and of which the short arm rests with one tooth —170— provided at its end against a disk —171— which has a notch at its periphery and at every two revolutions of the lever —62— performs a complete revolution.

In the position of rest all the parts are disposed in the manner shown in Fig. 30 and the indicators are uncovered. When the disk —171— begins to rotate in the direction indicated by the arrow, the tooth —170— is forced to come out of the notch on the full edge of the disk —171—, and the arm —168— of the angle lever carries the shutters behind the windows —6— and —7— and keeps the same in that position as long as the revolution of the handle is not finished and the drums are not again at rest. The drums —104— are mounted two by two on tubes —172— in such a way that, as in all other similar machines, the figures of the numbers appear in their natural order on the side toward the public as well as on the side toward the cashier.

The devices for printing the ticket and their duplicates, which remain in the machine, are placed on the left hand side and their disposition is seen in Fig. 31. The ribbon —173— on which are printed the tickets, unwinds from a roll loose upon a pivot —174— and suitably guided by rollers —175— passes upon a cylinder —176— in front of which is the cylinder —177— which prints the date and the other eventual permanent indications of the ticket. The composition is disposed in the raised portion —178— of the cylinder —177—, the developed length of which corresponds to the advancement of the ribbon —173—, viz. to the length of the ticket. An inking roller carried by an oscillating arm —179— supplies the composition with ink. Leaving the two cylinders —176—177— the ribbon passes upon an inclined guide —180—. Upon this guide is provided a roller —181— on which is wound a printing ribbon —182— which is similar to those employed for typewriting machines and unwinds from a roll —183—. An oscillating arm —184— which carries a pawl —185— acting on the periphery of a ratchet wheel —186— connected with the roller —181—; at each revolution of the cylinder —177— causes the printing ribbon —182— to move forward through the raised portion —178—. Above the ribbon —182— are the printing disks —146— mounted on the shaft —141—. Beneath the guide —180— is disposed an oscillating arm —187— which at its free end carries a knife blade —188— which cuts from the ribbon —173— resting upon the guide —180— a portion corresponding to the length of the ticket. The raising of the arm —187— for operating this cut is produced by a cam —189— having two noses mounted on the shaft —50—. At the first ascent the knife —188— cuts the ticket and at the same time a cushion —190— pushes the ticket against the printing disks —146— for printing the amount cashed and the sale department, after which the ticket is expelled, while the arm —187— falls down and during its ascent produced by the second nose of the cam —189— it causes to be printed the same indications which have been printed on the slip on the ribbon of the duplicate —191—, which unwinds from a roll —192— and winds upon a roll —193—. The winding of the said ribbon —191— takes place by means of a wheel having five teeth —194— which at each registration causes the wheel —195— to move forward. The wheel 195 is connected with the roll —193— and engages with the wheel —194—. On the same shaft on which is mounted the wheel —194— is mounted a cam —196— which acts upon the expelling device of the ticket. This consists in a lever oscillating around a pivot —197—, against the tail —198— of which presses the cam —196— which tends to lower it causing the end with the handle —199— provided with springs to rise. After having cut and printed the ticket, the cam —196— leaves the tail —198— of the expelling device and a spring —200— abruptly brings the handle —199— forward pressing with the same the ticket strongly against the plate —201— along which it causes the ticket to slide, the ticket coming out on the small pan —202—.

Having now fully described this my invention and how the same is to be carried out, what I claim is:

1. In cash registers with a single row of keys for registering values composed of any number of figures, the combination of oscillating pieces, keys adapted when lowered to permit oscillation of the oscillating pieces a distance corresponding to the value of the numeral to be registered, rotating pieces in the path of which the oscillating pieces are adapted to be moved to stop the movement of the rotating pieces, until the oscillating pieces resume the position of rest, pins adapted to be projected from the periphery of the rotating pieces during the stop, the pins projected being of greater or less number according to the duration of the stop, a summing apparatus having disks, printing devices, indicators of the values cashed, and actuating mechanisms for the said disks, printing devices and indicators, the said projected pins coming in gear with the said actuating mechanisms, a series of stops for causing the pins to resume their position of rest, an indicator having disks showing the figures of the number already composed, the said oscillating pieces acting upon the disks of said indicator, to cause the previously composed figures to disappear each time that a registration is effected.

2. In cash registers with a single row of keys, oscillating pieces corresponding to the units of the various orders, and a device for rotating the oscillating pieces a distance proportional to the value of the figures to be registered by lowering successively several keys, the said device comprising a shaft, pawls for engaging the oscillating pieces to prevent forward movement of the same, cams arranged in a spiral line on said shaft and each in the plane of the tail of one of said pawls, a frame oscillating around said shaft, and which at each oscillation causes the shaft to rotate a distance equal to that comprised between two successive cams, whereby one of said cams is brought in position for raising the tail of the corresponding pawl and freeing the oscillating piece kept back by said pawl, each key when lowered producing the same degree of oscillation of the said frame, and a transverse bar carried by each key and brought into the path of the oscillating piece freed from the pawl, to limit the amplitude of its oscillation.

3. In a cash register having a key board with ten keys for registering values comprising any number of figures, key levers all mounted to turn on the same shaft and carrying key heads at one end, a rotatable cam shaft, oscillating pieces controlled by the cam shaft, an oscillating frame which produces the revolution of the cam shaft, the said oscillating frame having a cross bar beneath which the other ends of said key levers terminate, and transverse bars carried by the key levers for limiting the amplitude of oscillation of the oscillating pieces.

4. In cash registers with one row of keys, the combination with a key board and key levers, of a shaft provided with a series of cams arranged in a spiral line at equal intervals, two ratchet wheels at the ends of said shaft, each of which has teeth corresponding in number to the number of the cams, the said wheels being rotated the one with respect to the other by an interval corresponding to the half of the width of a tooth, an oscillating frame on said shaft having cross bars one of which extends over the inner ends of all the key levers, a pawl carried on one of the sides of the frame and sliding on one of said ratchet wheels causing the same to advance when a key is lowered a distance corresponding to the half of the angular width of the tooth, an arm connected with the other side of the said frame and carrying a second pawl which slides on the other ratchet wheel, the said pawl at the ascent of the key causing the said wheel to turn a distance equal to that caused by lowering the key, so that by lowering and raising the key the said shaft advances a distance corresponding to the width of a tooth, or the interval between two successive cams.

5. In cash registers, a single row of keys each having a lever provided with a transverse bar, an oscillating piece adapted when a key is lowered to rotate a distance the value of which corresponds to the value of the figure to be registered, the said oscillating piece consisting of an arm, a pivot on which said arm is mounted to turn, a spring fastened to said arm and adapted to turn the same when the arm is freed, a toothed sector at the top of said arm, an indicator of the figures of the number composed, having a disk, the said disk being acted upon by the toothed sector, a toothed sector at the lower end of said arm having angular teeth, the said toothed sector at the front end being provided with a tooth adapted when the said oscillating piece is freed and advances under the pull of the spring, to strike against the transverse bar carried by the lever of a key which has been lowered.

6. In cash registers a key board with one row of keys, levers for the keys, a transverse bar carried by each lever and adapted to be raised when the key is lowered, an oscillating piece having a toothed sector, the said transverse bar being in the path of the sector when a key is lowered, a pawl engaging with the teeth of the sector to hold it in normal position, a shaft mounted to turn, a cam on said shaft for raising the tail of the pawl and releasing said sector, a spring for moving the oscillating piece to advance the toothed sector toward the bar of the lowered key, the said pawl when the tail is released by the cam engaging between two successive teeth of the sector, the said sector having a slight forward movement after the bar which stopped it is lowered, to cause the pawl to rest against the face of one of said teeth.

7. In cash registers, a key board with one row of keys, stopping bars carried by the keys, an oscillating piece provided with a toothed sector, an oscillating arm on said sector formed at its end with a tooth adapted to strike against a stopping bar when a key is lowered, the said oscillating arm being free to rotate upward, a stop which limits its rotation downward, and a spring for holding it against the stop, whereby when the machine has to register numbers which have two or more equal successive figures, the stopping bar when rising for composing the figures of the lower order, meets the tooth of the oscillating arm already advanced for the registration of the figures of the higher order, thereby raising the oscillating arm without displacing the oscillating piece and allowing the key to be lowered for the registration of the subsequent figure.

8. In cash registers, a row of keys, an indicator of the composed figures provided with indicating disks, a shaft, pawls carried by said shaft and connected with each other, the said pawls being equal in number to the said indicating disks, toothed wheels against which the said pawls rest, the toothed wheels being fastened to the disks, oscillating pieces, stopping bars carried by the keys and acting as stops for the oscillating pieces, toothed sectors carried by the oscillating pieces for rotating said wheels, the said toothed wheels being free to turn while the oscillating pieces advance for striking against said bars, the said pawls preventing the wheels from rotating in the opposite direction, thereby preventing the oscillating pieces from rebounding after striking against the said stopping bars.

9. In cash registers with one row of keys, actuating mechanism including oscillating pieces and a cam shaft for actuating the same, and a device for bringing the cam shaft back to the initial position of rest in case a mistake is made in the figures to be registered, the said device consisting of a correcting lever, a toothed sector carried by said lever, a toothed wheel mounted on an end of the cam shaft and engaged by said sector when the lever is rotated, the teeth of said wheel being one less in number than the number of the oscillating pieces, and having a space corresponding to a missing tooth, the said wheel being so arranged that when the shaft is in the position of rest, the toothed sector passes into the said space of the wheel, the toothed sector when the cam shaft has been rotated being adapted to engage the teeth of the wheel to rotate the same and carry the cam shaft to the initial position.

10. In cash registers with one row of keys the combination with oscillating sectors, and indicator disks connected therewith, of a device for bringing back to the initial position of rest, the lowered sectors and the disks, in case a mistake occurs in the figure to be registered, the said device consisting of a shaft on which the sectors oscillate, a frame comprising a cross bar, two arms carrying said cross bar and mounted to turn loosely on said shaft, a toothed wheel connected with said frame, a correcting lever, and intermediate wheels for moving the said toothed wheel from the correcting lever, the said cross bar being adapted when the correcting lever is rotated to successively meet the lowered oscillating sectors and carry the same and the disks of the indicator to the initial position.

11. In a cash register with one row of keys, the combination with an indicator of the composed figures having indicating disks, toothed wheels connected with said disks, oscillating sectors acting on said wheels, a shaft, and a group of pawls carried by said shaft, and adapted to engage the toothed wheels to prevent the back motion of the sectors and said disks, of means for freeing the said toothed wheels from the pawls, to allow the back motion of the oscillating sectors, in case of a mistake in the registration, the said means comprising an arm fixed to said pawl shaft, a shaft on which the oscillating sectors are mounted, a frame mounted to turn loosely on said shaft, a cross bar on said frame and adapted to engage the lowered sectors to return them to initial position, a toothed wheel connected with said frame, a lug connected with said toothed wheel, the arm on said pawl shaft resting with one of its ends against said lug, a correcting lever, means for rotating said toothed wheel from the connecting lever, the said lug when the correcting lever is turned being adapted to turn the arm on the pawl shaft to move the pawls away from the toothed wheels connected with the indicating disks, before the said cross bar engages the oscillating sectors.

12. In cash registers with one row of keys, the combination with key levers, an oscillating frame having cross bars and actuated by the key levers, a cam shaft, oscillating sectors, and indicators of the composed figures provided with disks connected therewith, and the pawls which prevent the back motion of said disks, of means for bringing the cam shaft, the lowered oscillating sectors, and the disks of the indicator, to the initial position, and preventing during this operation the lowering of any one of the keys, the said means consisting of a lever, a toothed wheel, carried by said lever, a second toothed wheel to which the movement is transmitted, and means actuated by said second toothed wheel for causing the ascent of the oscillating pieces and the freeing of the indicator disks from said pawls, the said lever being provided at its lower end with a toothed sector, adapted to bring the cam shaft to initial position, a piece secured to said toothed sector and having its lower edge in the shape of an arc of a circle and resting during the rotation of the lever against the front bar of the oscillating frame, thus preventing the lowering of any one of the keys.

13. In cash registers with one row of keys, the combination with a cam shaft, oscillating sectors, and an operating handle, of means for preventing any rotation of the cam shaft during the revolution of the operating handle, the said means consisting of a disk at an end of the cam shaft provided with a notch, a second disk which turns when the operating handle is turned the second disk also having a notch, and a lever provided at its two ends with two teeth, one of which when the machine is in motion enters the notch of the disk connected with the cam shaft, while the other tooth rests against the outer edge of the disk which turns with the lever, the second of said teeth, when the machine is stopped engaging the notch of the disk which turns with the lever, and the first of said teeth resting upon the outer edge of the disk at the end of the cam shaft as long as the revolution of the cam shaft continues, in order to operate the successive oscillating sectors.

14. In cash registers with a row of keys the combination with summing apparatus having disks, printing apparatus, and indicators of amount, of the oscillating sectors, and a computing drum controlling the movement of the disks of the summing apparatus, the printing apparatus, and the said indicators, the said computing drum consisting of a shaft, a disk fixed on the shaft, an operating handle for turning the shaft, the said disk having nine radial grooves, nine pins sliding in said grooves and adapted to be projected from the periphery of the disk, a second disk mounted loose on the shaft against the first disk, a flat spring constituting a friction joint between the disks and causing the second disk to be carried by the first disk when the latter is moving, the second disk having a groove formed by four arcs two of said arcs being nearer the center than the other two, pivots projecting laterally from the radial pins and guided in said groove, two stopping blocks on the outer face of said second disk, and stops adapted to extend into the path of said blocks to stop the second disk which therefore is retarded with respect to the first disk, so that during a complete revolution of the latter the radial pins are projected twice and are twice retracted.

15. In cash registers with one row of keys the combination with the keys, an oscillating piece actuated when a key is lowered, the said oscillating piece being advanced proportional to the value of the figures indicated on the head of the key, the said oscillating piece being provided with a lug, a computing drum having a shaft, a disk fixed to the shaft, and a disk movable on the shaft, stopping blocks on the movable disk in the path of which the said lug is adapted to extend, and radial pins adapted to be projected from the periphery of the disk fixed to the shaft, of summing apparatus having disks, printing disks, and indicators of the amounts cashed having disks, a toothed wheel connected with the disks of the summing apparatus, a toothed wheel connected with the printing disks and with the disks of said indicators, both of said wheels being in the plane of the pins projected from the fixed disk, the interval between the points of contact of the drum with the said wheels having such a width as to comprise eight pins.

16. In cash registers with one row of keys, the combination with the keys, summing apparatus having a toothed wheel, a printing device and indicators of the amounts cashed having a toothed wheel, of a computing drum comprising a shaft, a keyed disk and a loose disk on the said shaft, an oscillating sector actuated by a key and adapted to advance a distance proportional to the value of the figure to be registered, a lug carried by said oscillating sector, stopping blocks on the outer face of the loose disk, the said lug when the oscillating sector is advanced being in the path of said stopping blocks and adapted to be engaged thereby to stop the loose disk, the said lug keeping the disk at rest until the oscillating sector returns to normal position and removes the lug from the path of said disk, the time of rest of the loose disk being proportional to the value of the figures to be registered, pins adapted to be projected from the keyed disk when the loose disk is at rest to act on the said toothed wheels, the number of said pins projected corresponding to the units in the figure to be registered, and a stop adapted to extend into the path of the stopping block and stop the said loose disk after it is left free by the lug, the stopping of said disk causing the remaining pins to be projected and then all of them to be retracted after they have acted upon said toothed wheels.

17. In cash registers with one row of keys, the combination with summing apparatus, indicators, and their actuating wheels, of a shaft, computing drums, each comprising a disk fixed to the shaft, a disk loose on the shaft and provided with stopping blocks, and pins adapted to be projected from the computing drums and to be retracted, oscillating sectors having lugs for engaging the stopping blocks to cause the projection of pins, the pins when projected acting on the wheels of the summing apparatus and the indicators, and means for causing the pins remaining inside the computing drums after the action of the lugs of the oscillating sectors, to be projected, and causing them to again enter the computing drums, the said means comprising a shaft, arms connected with said shaft and corresponding in number with the computing drums, an arm at one end of the shaft, a cam fastened to the shaft carrying the computing drums, the said arm resting at one of its ends on said cam, the said cam being adapted to move the arms corresponding to the computing drums into the paths of said stopping blocks to keep back the loose disks, after the oscillating sectors have left the same to cause the remaining pins to be projected after they can no longer act on the said wheels of the summing apparatus and indicators.

18. In cash registers with one row of keys, the combination with an indicator of the composed figures having disks, a shaft, computing drums each having a disk fixed to the shaft, and a loose disk provided with stopping blocks, oscillating sectors connected with the indicator disks and having lugs extending, when the sectors are advanced into the path of said stopping blocks, of means for starting simultaneously the backward movement of the oscillating sectors toward the position of rest as soon as they meet the said stopping blocks, the said means comprising a toothed wheel secured to the side of each indicator disk, the said wheels each having ten teeth and a space corresponding to an eleventh tooth which is missing, a second similar wheel placed in the plane of the first wheel and adapted to mesh therewith, a toothed sector connected with the fixed disk of each computing drum, a wheel permanently engaging the last mentioned wheel and receiving motion from said toothed sector, the spaces of the first and second wheels, in the position of rest being in line with the center of the wheels so that the second wheel can turn freely without moving the first wheel, the toothed sector of the fixed disk of the computing drum being adapted when in operation to meet and impart movement to the last mentioned wheel and through it to said second toothed wheel at the time the stopping blocks meet the lugs of the corresponding oscillating sector and the indicator disk has advanced, the said second toothed wheel moving the first toothed wheel and with it the disk of the indicator and the oscillating sector until the same are brought back to the position of rest.

19. In cash registers with one row of keys, the combination with summing apparatus having disks, indicators of the amount cashed having drums, and computing drums which control the movement of the disks of the summing apparatus and comprising a shaft, disks fixed to said shaft, loose disks on said shaft, and pins projecting from the periphery of the computing drums, of a shaft provided with sleeves, a printing disk carried at one end of each sleeve, a toothed wheel carried at the other end, a chain passing over said toothed wheel and transmitting the movement to the drums of the indicators, a second toothed wheel on each sleeve receiving movement from the pins of the computing drum, a third wheel having nine teeth and a space corresponding to a tenth tooth which is missing, a toothed sector fastened to the fixed disk of the corresponding computing drum, the teeth of said sector in the position of rest being adapted to pass freely through the space of said third wheel, the said sector when the printing device is advanced engaging with the said wheel and advancing the same to cause the space of the said wheel to be returned to the position of rest.

20. In cash registers, the combination with sleeves mounted to turn, printing disks connected with the sleeves, and wheels carried by the sleeves, of a stopping device for preventing the printing disks from passing beyond the position of zero, when they are brought back into the initial position, the said device comprising a shaft, a series of pawls mounted upon said shaft and corresponding in number with the said sleeves, an arm at the end of the shaft, a cam on which the free end of said arm slides, a toothed sector for imparting movement to one of said wheels of the sleeves to bring the printing disk to zero, pins projecting laterally from said wheels the said cam causing said pawls to move into the path of said pins, the said pin meeting the pawl when the printing disk has reached the position of zero, and stopping the sleeve.

21. In cash registers, the combination with printing disks, sleeves mounted to turn and connected with the printing disks, toothed wheels carried by said sleeves, and computing drums having pins for advancing the printing disks, each computing drum having a movable disk and a block fastened to the outer face thereof, of a locking device for preventing the printing disks from passing the position which corresponds to the figure to be printed and from moving from said position after they have reached it, the said locking device consisting of a shaft, a series of pawls loosely mounted on the shaft, each of said pawls being formed by an angle lever, one arm of said pawl resting against a block on the movable disk of the corresponding computing drum, the other arm of said pawl being so arranged that the sleeve with which the printing disk is connected is free to turn while the printing disk is advanced by the pins of the computing drum, the said block being arranged to release the said arm of the pawl resting thereon at the moment the printing disk ceases to advance to cause the end of the other arm of said pawl to engage the toothed wheel of the sleeve thereby preventing any further displacement of the latter.

22. In cash registers with a single row of keys, a device for printing the tickets and their duplicates, comprising in combination a ribbon for the tickets, a ribbon for the duplicates, an inking ribbon for printing the tickets and duplicates, a printing cylinder having a raised zone with the permanent indications to be printed upon the tickets, an inking roller designed to ink the said raised zone, an oscillating arm acted upon by the raised zone, and causing the inking ribbon to advance, printing disks each comprising only one series of figures, a knife designed to cut the tickets, an oscillating arm at the free end of which is fastened the said knife, a cushion on the said arm, a cam mounted to turn and provided with two noses for producing the oscillations of the arm, and means designed to expel the tickets cut off, the first nose on the said cam raising the arm a first time to cut the ticket and push it on the cushion and the printing disks, and the second nose on the said cam raising the arm a second time, after the expulsion of the ticket, to print on the ribbon of the duplicates the same indications already printed upon the ticket expelled.

In witness whereof, I have hereunto signed my name in the presence of two subscribing witnesses.

ROBERTO TAEGGI PISCICELLI.

Witnesses:
PAUL HENRY,
GASTON LABARRE.

Copies of this patent may be obtained for five cents each, by addressing the "Commissioner of Patents, Washington, D. C."